United States Patent
Salinger et al.

(10) Patent No.: US 9,930,327 B2
(45) Date of Patent: Mar. 27, 2018

(54) DISTRIBUTED NETWORK PERFORMANCE MONITORING

(71) Applicant: COMCAST CABLE COMMUNICATIONS, LLC, Philadelphia, PA (US)

(72) Inventors: Jorge Daniel Salinger, Littleton, CO (US); Maurice Garcia, Levittown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/932,629

(22) Filed: Jul. 1, 2013

(65) Prior Publication Data
US 2013/0305302 A1    Nov. 14, 2013

Related U.S. Application Data

(63) Continuation of application No. 12/469,168, filed on May 20, 2009, now abandoned.

(51) Int. Cl.
*H04H 60/33* (2008.01)
*H04H 60/32* (2008.01)
(Continued)

(52) U.S. Cl.
CPC .......... *H04N 17/004* (2013.01); *H04N 7/104* (2013.01); *H04N 21/6118* (2013.01); *H04N 21/6168* (2013.01); *H04N 21/64723* (2013.01)

(58) Field of Classification Search
CPC .......... H04N 21/6118; H04N 21/6168; H04N 21/64723; H04N 21/2407; H04N 21/239;
(Continued)

(56) References Cited

U.S. PATENT DOCUMENTS

| 4,367,557 A | 1/1983 | Stern et al. |
| 5,862,451 A | 1/1999 | Grau et al. |

(Continued)

OTHER PUBLICATIONS

OpenCable(TM) Specifications, CableCARD(TM) Interface 2.0 Specification, OC-SP-CCIF2.0-I07-060803, Aug. 3, 2006, 305 pages.
(Continued)

*Primary Examiner* — Nasser Goodarzi
*Assistant Examiner* — Fred Peng
(74) *Attorney, Agent, or Firm* — Banner & Witcoff, Ltd.

(57) ABSTRACT

A probe is configured to monitor one or more communication parameters on one or more downstream frequency channels carried on a communication medium of an access network. Results of repeated monitoring are stored over a predetermined period. At the conclusion of the monitoring period, data reports reflecting the stored results are transmitted in upstream frequency channels carried on the same medium. The probe can also be configured to send immediate messages if a parameter exceeds predefined limits and can store a plurality of monitoring programs and can be reprogrammed remotely. The probe can be contained within a cable tap if the medium is, e.g., a coaxial cable. Numerous probes can be deployed throughout an access network so as to provide monitoring data from each of many locations over a prolonged period.

20 Claims, 9 Drawing Sheets

(51) Int. Cl.
*H04H 60/29* (2008.01)
*H04H 20/14* (2008.01)
*H04N 7/173* (2011.01)
*H04N 17/00* (2006.01)
*H04N 7/10* (2006.01)
*H04N 21/61* (2011.01)
*H04N 21/647* (2011.01)

(58) Field of Classification Search
CPC ....... H04N 21/25841; H04N 21/23418; H04N 21/4343; H04N 21/4344; H04N 21/4345; H04N 7/102; H04N 21/8358
USPC .......................................... 725/22, 23, 14, 9
See application file for complete search history.

(56) References Cited

U.S. PATENT DOCUMENTS

| | | | |
|---|---|---|---|
| 5,872,588 A * | 2/1999 | Aras et al. | ....................... 725/14 |
| 6,044,090 A | 3/2000 | Grau et al. | |
| 6,266,519 B1 | 7/2001 | Eguchi et al. | |
| 6,411,725 B1 * | 6/2002 | Rhoads | ....................... 382/100 |
| 6,598,232 B1 * | 7/2003 | McAlear | ............... H04N 7/102 |
| | | | 348/E7.052 |
| 6,650,761 B1 * | 11/2003 | Rodriguez | ........ G06F 17/30876 |
| | | | 382/100 |
| 7,162,731 B2 | 1/2007 | Reidhead et al. | |
| 7,577,841 B2 * | 8/2009 | Celik | ........................... 713/176 |
| 7,623,673 B2 * | 11/2009 | Mercier | ........................ 382/100 |
| 7,865,915 B1 * | 1/2011 | Clark et al. | .................... 725/10 |
| 8,024,221 B2 * | 9/2011 | Porte | ........................... 705/14.4 |
| 8,194,657 B2 * | 6/2012 | Xiong | ..................... H04L 45/00 |
| | | | 370/230 |
| 8,472,442 B2 * | 6/2013 | Lee et al. | ....................... 370/392 |
| 2001/0055319 A1 * | 12/2001 | Quigley | .................. H04L 1/203 |
| | | | 370/480 |
| 2002/0059633 A1 * | 5/2002 | Harkness | ............... H04H 20/14 |
| | | | 725/108 |
| 2003/0028891 A1 | 2/2003 | Hardt et al. | |
| 2003/0110516 A1 * | 6/2003 | Chang et al. | ................. 725/136 |
| 2004/0233895 A1 | 11/2004 | Linares | |
| 2005/0114879 A1 | 5/2005 | Kamieniecki | |
| 2005/0183130 A1 | 8/2005 | Sadja et al. | |
| 2006/0015735 A1 * | 1/2006 | Kudo et al. | ................... 713/176 |
| 2007/0003102 A1 * | 1/2007 | Fujii | ..................... G06T 1/0071 |
| | | | 382/100 |
| 2007/0058043 A1 | 3/2007 | Thukral | |
| 2007/0101395 A1 | 5/2007 | Cha | |
| 2007/0169162 A1 | 7/2007 | Kola | |
| 2007/0220544 A1 * | 9/2007 | Nash-Putnam | ................. 725/32 |
| 2008/0080607 A1 * | 4/2008 | Shah | ................ H04L 25/03019 |
| | | | 375/232 |
| 2008/0151873 A1 * | 6/2008 | Borsetti | ................ H04M 7/009 |
| | | | 370/352 |
| 2008/0178229 A1 * | 7/2008 | Kliger | ................ H04L 12/2803 |
| | | | 725/79 |
| 2008/0209491 A1 * | 8/2008 | Hasek | ........................... 725/114 |
| 2009/0044222 A1 | 2/2009 | Machida et al. | |
| 2009/0122879 A1 | 5/2009 | Howe et al. | |
| 2009/0131123 A1 * | 5/2009 | Coersmeier | .......... H04B 1/1036 |
| | | | 455/574 |
| 2009/0164550 A1 * | 6/2009 | Rahrer | ................ H04L 41/0677 |
| | | | 709/202 |
| 2009/0185037 A1 * | 7/2009 | Shi | ......................... H04B 17/21 |
| | | | 348/184 |
| 2009/0328119 A1 * | 12/2009 | Kan | ................... H04N 21/6473 |
| | | | 725/107 |
| 2010/0299713 A1 | 11/2010 | Salinger et al. | |
| 2011/0099570 A1 | 4/2011 | Sadja et al. | |
| 2012/0180083 A1 * | 7/2012 | Marcus | ........................... 725/32 |

OTHER PUBLICATIONS

OpenCable(TM)—CableCARD(TM) Primer, CableCARD(TM) Overview <http://cablelabs.com/opencable/primer/cablecard_primer.html>, 3 pages, Sep. 10, 2012.
Extended European Search Report—EP 10162738.8—dated Oct. 8, 2014.
Response to European Search Report—EP 10162738.8—dated Apr. 28, 2015.
CA, 2704091, May 13, 2010, Distributed Network Performance Monitoring.
EP, 10162738.8, May 12, 2010, Distributed Network Performance Monitoring.
Canadian Office Action—CA App 2,704,091—dated Aug. 16, 2016.
Aug. 2, 2017—Canadian Office Action—2,704,091.
Oct. 10, 2017—European Office Action—EP 10162738.8.

* cited by examiner

| | CF/BW | PARAM = 0 (RF level) | PARAM = 1 (MER) | PARAM = 2 (CW err) | Param = 3 (SNR) | PARAM = 4 (PLL lock) | PARAM = 5 (CN) | PARAM = 6 (CF var) | PARAM = 7 (BER) | PARAM = 8 (CNR) | PARAM = 9 (data a) | ... | PARAM p (parameter) |
|---|---|---|---|---|---|---|---|---|---|---|---|---|---|
| CHAN = 0 | $F_0/B_0$ | T(0,0) | T(0,1) | T(0,2) | T(0,3) | T(0,4) | T(0,5) | T(0,6) | T(0,7) | T(0,8) | T(0,9) | ... | T(0,p) |
| CHAN = 1 | $F_1/B_1$ | T(1,0) | T(1,1) | T(1,2) | T(1,3) | T(1,4) | T(1,5) | T(1,6) | T(1,7) | T(1,8) | T(1,9) | ... | T(1,p) |
| CHAN = 2 | $F_2/B_2$ | T(2,0) | T(2,1) | T(2,2) | T(2,3) | T(2,4) | T(2,5) | T(2,6) | T(2,7) | T(2,8) | T(2,9) | ... | T(2,p) |
| CHAN = 3 | $F_3/B_3$ | T(3,0) | T(3,1) | T(3,2) | T(3,3) | T(3,4) | T(3,5) | T(3,6) | T(3,7) | T(3,8) | T(3,9) | ... | T(3,p) |
| CHAN = 4 | $F_4/B_4$ | T(4,0) | T(4,1) | T(4,2) | T(4,3) | T(4,4) | T(4,5) | T(4,6) | T(4,7) | T(4,8) | T(4,9) | ... | T(4,p) |
| ... | ... | ... | ... | ... | ... | ... | ... | ... | ... | ... | ... | ... | ... |
| CHAN = c | $F_c/B_c$ | T(c,0) | T(c,1) | T(c,2) | T(c,3) | T(c,4) | T(c,5) | T(c,6) | T(c,7) | T(c,8) | T(c,9) | ... | T(c,p) |

DISTRIBUTED NETWORK PERFORMANCE MONITORING

RELATED APPLICATIONS

This application is a continuation of U.S. patent application Ser. No. 12/469,168, filed May 20, 2009, and entitled "DISTRIBUTED NETWORK PERFORMANCE MONITORING," the disclosure of which is incorporated by reference herein in its entirety and made part hereof.

BACKGROUND

Figure 1:
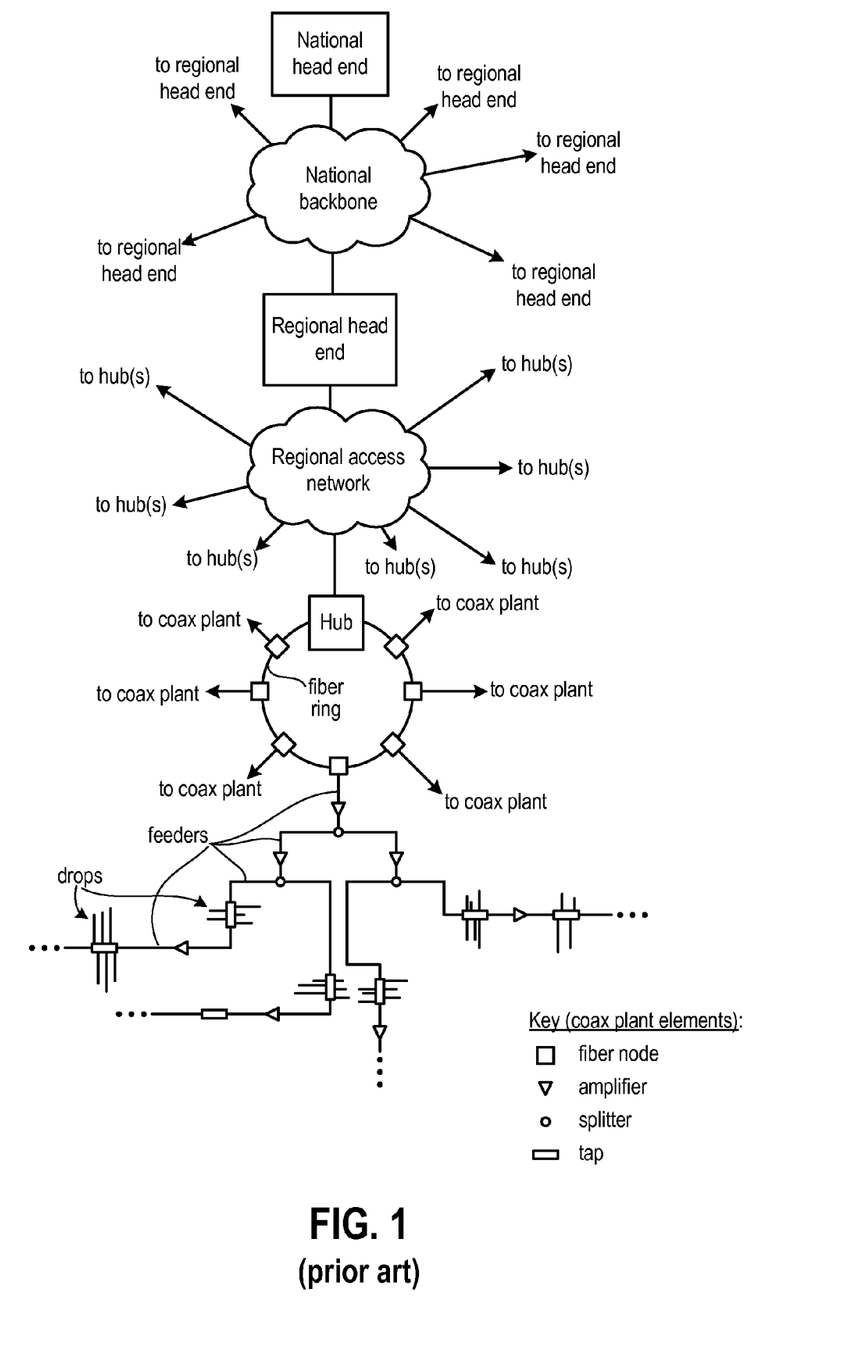
FIG. 1 is a block diagram showing selected elements of a national cable network.

In addition to cable television (CATV), many cable system operators provide high speed internet access, video on demand (VOD), Voice over IP (VoIP) telephone and numerous other services to subscribers. To provide such services, cable system operators must manage and maintain increasingly complex networks. FIG. 1 is a block diagram showing an example of such a network. A national head end may include elements such as VOD servers, servers for receiving and encapsulating programming content, management servers, etc. The national head end communicates with multiple regional head ends over a national backbone network, with the regional head ends also including facilities for VOD and programming reception/encapsulation. Each regional head end communicates over a regional access network with multiple hubs. Each hub includes a cable modem termination system (CMTS), devices for quadrature amplitude modulation/demodulation (QAM), and other elements.

From the hubs, individual homes or other subscriber locations are reached via a hybrid fiber coax (HFC) access network. The fiber optic portion of the HFC access network includes multiple nodes on a fiber optic ring. The coaxial portion of the HFC access network includes coaxial feeder lines extending from those nodes. Drop coaxial cables extend from taps in the feeder cables and connect to the subscriber premises. Amplifiers are distributed along the coaxial feeder cables. Alternating current (AC) power may also be input into the feeder cables so as to provide a power source for the amplifiers. For simplicity, FIG. 1 only shows a very small part of the coaxial portion of an HFC network associated with a single hub. In actuality, the coaxial cable plants associated with hubs may be the largest part of the system, and there may be many subscribers receiving service through a particular hub.

Communication through a coaxial cable can be affected in many ways. As but one example, temperature changes can affect signal quality in coaxial cables. To detect, prevent and correct communication problems, signal quality measurements from the coaxial part of an HFC network can be very useful. Unfortunately, obtaining such measurements for a large portion of a coaxial cable network over a prolonged period has not been practical. Existing test equipment is relatively expensive, and in many cases a field service technician must be dispatched to take measurements. Some set top boxes and cable modems can measure certain signal parameters, but only over a few channels at a time and at relatively infrequent intervals. Moreover, signal measurements from inside a subscriber premises may not be indicative of a network problem. For example, signal degradation within a subscriber location could be affected by a splitter or other subscriber-installed component and not by a systemic network condition.

SUMMARY

This Summary is provided to introduce a selection of concepts in a simplified form that are further described below in the Detailed Description. This Summary is not intended to identify key features or essential features of the invention.

At least some embodiments include a probe that can be installed in a desired location in an access network. In certain embodiments, a probe can be installed in a coaxial cable plant of an access network. The probe is configured to monitor one or more communication parameters on one or more downstream frequency channels carried on a physical medium such as a coaxial cable. Results of repeated monitoring are stored over a predetermined period. At the conclusion of the monitoring period, data reports reflecting the stored results are transmitted in upstream frequency channels carried on the same medium. The probe can also be configured to send immediate messages if a parameter exceeds predefined limits. The probe can store a plurality of monitoring programs and can be reprogrammed remotely. In some embodiments, the probe is contained within a cable tap. Numerous probes can be deployed throughout a coaxial cable plant so as to provide monitoring data from each of many locations over a prolonged period.

BRIEF DESCRIPTION OF THE DRAWINGS

Some embodiments of the present invention are illustrated by way of example, and not by way of limitation, in the figures of the accompanying drawings and in which like reference numerals refer to similar elements.

DETAILED DESCRIPTION

In at least some embodiments, numerous probes throughout a coaxial cable plant monitor communication parameters. As used herein "coaxial cable plant" refers to the portion of an access network that transmits signals over coaxial cable. Some of the parameters measured by the probes are indicative of signal quality in the coaxial cable plant (e.g., RF signal level, modulation error ratio, etc.). Some parameters are indicative of whether a particular data payload (e.g., data for one or more programming services such as HBO, ESPN, etc.; a specific advertisement; a governmentally-required emergency message; etc.) has been transmitted. Each probe is coupled to a coaxial cable, monitors signals on that cable, and reports monitoring data upstream over the same coaxial cable. Because the probes in at least some embodiments are relatively inexpensive and automated, they can be widely deployed and provide data over prolonged periods of time. The probes can also be remotely controlled and/or reprogrammed to provide specific data when needed. In at least some embodiments, and as described in further detail below, the probes are sized and configured for attachment to one of the drop outputs of a cable tap. In other embodiments, the probes are housed within a tap.

In a typical cable system, coaxial cable carries communications in frequencies that may be as low as 5 MHz and as high as 1002 MHZ (or higher). In many systems, frequency channels in the lower portion of the available frequency spectrum are used to carry upstream communications from subscriber devices to the hub. Higher frequency channels are used to carry downstream communications from the hub to subscriber devices. The downstream frequency channels usually have bandwidths of 6 MHz or 8 MHz, although upstream channels may use narrower bands.

In at least some cable systems, most upstream and downstream communications with a subscriber device over a coaxial cable are in accordance with the set of standards known as Data over Cable Service Interface Specifications (DOCSIS) promulgated by (and available from) from Cable Television Laboratories, Inc. of Louisville, Colo. Under the latest version of the applicable DOCSIS standard, downstream 6 MHz or 8 MHz channels can be distributed between 108 MHz and 1002 MHz and upstream channels are located between 5 MHz and 42 (or 85) MHz. Frequency channels between these two regions are used for non-DOCSIS communications (e.g., legacy analog CATV programming). Upstream frequency channels and at least the downstream frequency channels above 108 MHz are typically modulated using quadrature amplitude modulation (QAM).

Downstream frequency channels can be used to communicate many types of data. For example, some downstream channels may be used to send generic user data payloads (e.g., data from an Internet site to which a subscriber has navigated, an email, a downloaded file, etc.) to a subscriber cable modem (CM) for further communication to a home computer. As another example, some downstream channels may be used to transmit digital video data payloads to a subscriber set top box (STB) for ultimate display on a television. Some channels may transmit several types of data by, e.g., interspersing packets containing digital video with packets containing generic user data. To accommodate multiple possible data types in a downstream channel, the DOCSIS standards require that downstream data packets be contained in 188-byte Moving Picture Expert Group (MPEG) packets. Each MPEG packet has a 4-byte header that includes a 13-bit packet identifier (PID) indicating the type of data contained in the MPEG packet. Generic user data and DOCSIS media access control (MAC) management messages are contained in one or more MAC frames that follow the 4-byte MPEG header, with each MAC frame also having its own MAC header.

Figure 2:
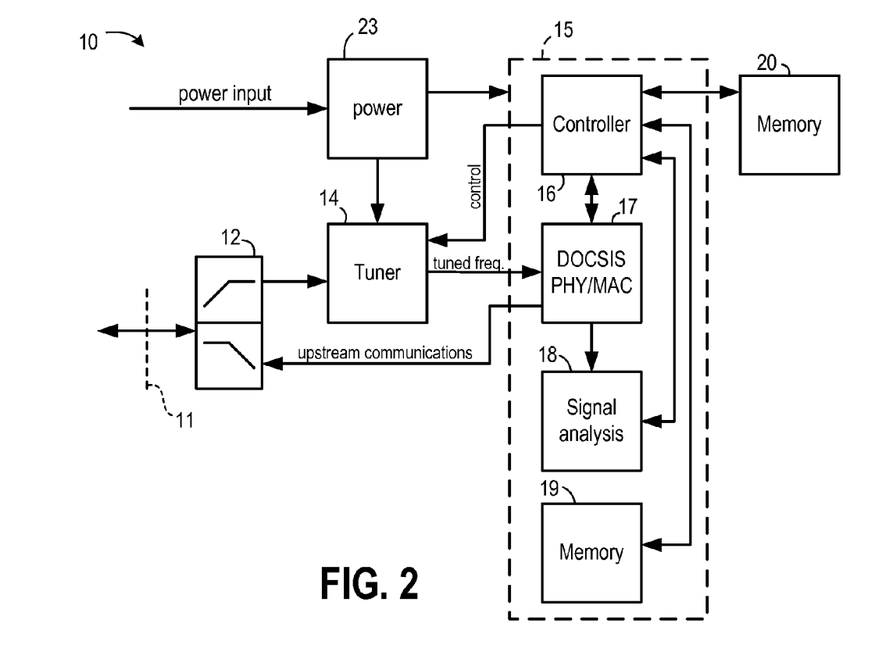
FIG. 2 is a block diagram of a monitoring probe according to at least some embodiments.

FIG. 2 is a block diagram of a monitoring probe 10 according to at least some embodiments. Probe 10 connects to a coaxial cable over a hardware interface 11. In some embodiments, hardware interface 11 is a standard coaxial cable coupler that can be directly connected to a drop output of a cable tap. In other embodiments, probe 10 is part of a coaxial cable tap and monitors downstream frequency channels carried by a feeder coaxial cable connected to a forward RF input of the tap.

Hardware interface 11 is connected to a diplexer 12 that allows downstream signals to pass into probe 10 and upstream signals to pass out of probe 10. Downstream signals flow from diplexer 12 to a wideband tuner 14. In response to a control signal from controller 16 identifying a frequency channel to be tuned, tuner 14 forwards a signal for the tuned frequency channel. In some embodiments, tuner 14 is a single wideband tuner that is able to selectively tune to any frequency channel between 108 MHz and 1002 MHz. In other embodiments, tuner 14 is able to tune to channels below 108 MHz and/or above 1002 MHz. In still other embodiments, tuner 14 can be replaced with multiple tuners that tune across narrower bands.

In at least some embodiments, main processor 15 is a single application specific integrated circuit (ASIC) having signal analysis circuits and programmable logic for performing operations as described herein. These circuits and logic are represented by functional blocks 16 through 18 for purposes of explanation. Controller 16 contains logic for executing instructions that control the operation of main processor 15 and tuner 14. Controller 16 also executes instructions to perform more advanced signal and/or data analysis. For example, and as described below, controller 16 is in some embodiments configured to examine specific data fields within a MPEG transport packet or a digital video payload packet and determine if specific packets have been received. In addition to hard-wired instructions, controller 16 reads instructions stored in one or more memories 19 or 20 and executes those instructions. Memories 19 and 20 may include non-volatile read-only memory (ROM), volatile random access memory (RAM) and non-volatile read/write memory (e.g., FLASH memory). Fully and/or partially programmable microprocessor circuits for performing the herein-described operations of controller 16 (and other portions of main processor 15) are either known in the art or can be readily constructed by persons of ordinary skill in the art once such persons are provided with the information contained herein. In some embodiments, the tuner 14, diplexer 12 and/or memory 20 may be included on the same ASIC chip with main processor 15.

The signal from tuner 14 is initially processed by DOCSIS PHY/MAC sub-processor 17. SUB-processor 17 includes a demodulator and processes the QAM physical (PHY) and DOCSIS media access control (MAC) layers. With regard to downstream communication, for example, DOCSIS PHY/MAC sub-processor 17 demodulates QAM signals, performs forward error correction (FEC) decoding and deinterleaving, reads MPEG transport stream headers to identify packets as DOCSIS MAC packets or digital video packets, extracts DOCSIS MAC payloads from MPEG packets containing DOCSIS MAC payloads, reads MAC headers and MAC management messages, etc. With regard to upstream communications from probe 10, DOCSIS PHY/MAC sub-processor 17 generates MAC management messages according to the DOCSIS MAC protocol, encapsulates data for transmission upstream according to the DOCSIS MAC protocol, performs error correction coding and interleaving, performs QAM modulation, etc. Additional DOCSIS PHY and MAC operations that are performed by a DOCSIS-compliant subscriber device are defined by the applicable DOCSIS standards, including but not limited to the following: DOCSIS 3.0 Physical Layer Specification (CM-SP-PHYv3.0-107-080522); DOCSIS 3.0 MAC and Upper Layer Protocols Interface Specification (CM-SP- MULPIv3.0-I08-080522); and Downstream RF Interface Specification (CM-SP-DRFI-I06-080215). In at least some embodiments, DOCSIS PHY/MAC sub-processor 17 is configured to perform all PHY and MAC operations that a conventional DOCSIS-compliant CM or STB can perform.

DOCSIS PHY/MAC sub-processor 17 measures some of the signal quality and other communications parameters, discussed in more detail below, for the tuned frequency channel. Sub-processor 17 then communicates these measurements and other data to controller 16 so that controller 16 may, e.g., store such data in memory 19 and/or memory 20 for additional analysis and/or later communication upstream. As represented by the double-headed arrow connecting blocks 16 and 17, sub-processor 17 also receives data and control signals from controller 16. The control signals and data sent to sub-processor 17 by controller 16 could include instructions to provide certain data or signal measurements, data and instructions to transmit that data in an upstream message, etc.

Persons of ordinary skill could, based on the above-identified DOCSIS standards and other known DOCSIS standards, and based on the information provided herein, include appropriate DOCSIS PHY and MAC circuits in an ASIC design for main processor 15. Indeed, numerous existing and commercially-available ASICs are designed to perform DOCSIS PHY and MAC layer functions. When provided with the information herein, persons of ordinary skill could incorporate the functionality of such existing ASIC designs into an ASIC that also includes the functionality of controller 16 and other elements of main processor 15 that are described herein.

In some embodiments, DOCSIS PHY/MAC sub-processor 17 also outputs a demodulated signal for additional analysis in signal analysis sub-processor 18, which includes additional circuits and logic for performing analyses to obtain desired data about downstream signals. In some embodiments, signal analysis sub-processor 18 may in some embodiments be dedicated to certain types of signal measurements that fall outside of normal DOCSIS PHY/MAC processing. Measurements and other data from signal analysis sub-processor 18 are provided to controller 16, which may store such measurements and data in memory 19 or memory 20 for additional analysis and/or later communication upstream.

In addition to receiving and analyzing downstream communications, main processor 15 sends reporting data and other communications upstream. Examples of such upstream communications, which pass from main processor 15 to diplexer 12 and hardware interface 11, are described below.

Finally, probe 10 includes a power supply circuit 23 that provides electrical operating power to main processor 15 and tuner 14. Power supply circuit 23 receives input power from a power source and converts that power to an appropriate form for main processor 15 and tuner 14. Power supply and conversion circuits are known in the art and thus are not further described herein. In some embodiments, and as explained below, circuit 23 receives input power from the AC power supplied in a coaxial feeder cable. In other embodiments, a probe power supply circuit may receive incoming power from a battery, from a conventional AC line source, or from some other source.

Figure 3:
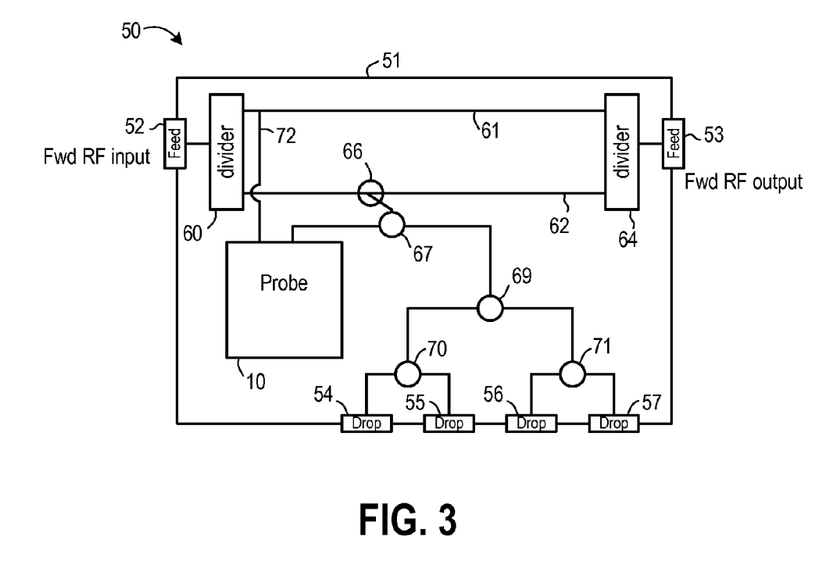
FIG. 3 is a block diagram of a monitoring probe incorporated into a cable tap.

FIG. 3 is a partially schematic diagram showing one example of a coaxial cable plant component into which probe 10 of FIG. 2 can be incorporated. In the embodiment of FIG. 3, probe 10 is incorporated into a outdoor coaxial trunk tap 50. As with conventional trunk taps, housing 51 of tap 50 includes an input connector 52 that attaches to a coaxial feeder cable providing the forward RF input and an output connector 53 that attaches to another coaxial feeder cable carrying the forward RF output. Connectors 54, 55, 56 and 57 attach to coaxial drop cables that carry signals to subscriber premises. In many systems, coaxial feeder cables are also used to supply AC power to amplifiers located in the coaxial cable plant. Accordingly, tap 50 includes a divider 60 that operates (in a manner known in the art) to direct AC power carried by the feeder cable along an AC path 61 and the RF communication signals carried by the feeder cable on a RF path 62. Paths 61 and 62 connect to a combiner 64 that rejoins the AC power and RF communication in a manner also known in the art. A directional coupler 66 connects RF path 62 to a first splitter 67. A branch connects splitter 67 to a second splitter 69, which has branches connecting to additional splitters 70 and 71. Branches from splitters 70 and 71 connect to connectors 54, 55, 56 and 57. Another branch from splitter 67 provides the downstream signal input to probe 10 and receives the upstream signal output from probe 10. Input power to probe 10 is received from a connection 72 to AC path 61.

Figure 4:
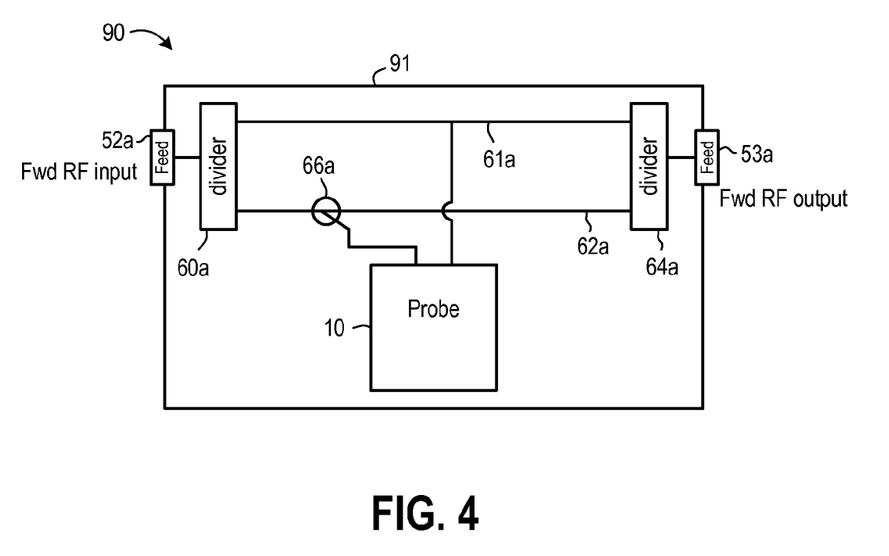
FIG. 4 is a block diagram of a monitoring probe incorporated into another type of device connectable to a coaxial cable network.

FIG. 4 is a partially schematic diagram showing another manner in which probe 10 can be incorporated into a coaxial cable plant component. In particular, FIG. 4 shows probe 10 incorporated into an in-line component 90 having a housing 91 and two connectors 52a and 53a configured for attachment to coaxial feeder cables. Elements of the embodiment of FIG. 4 that are similar to elements in the embodiment of FIG. 3 have been given similar reference numbers, but with an "a" appended. The embodiment of FIG. 4 is similar to the embodiment of FIG. 3, except that no drop connectors are included.

Figure 5:
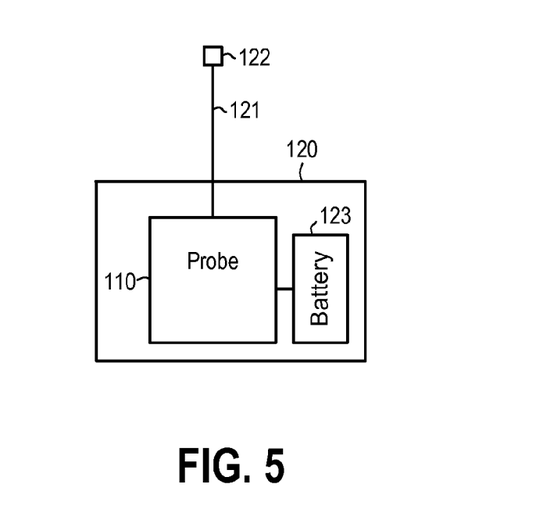
FIG. 5 is a block diagram of a monitoring probe incorporated into yet another type of device connectable to a coaxial cable network.

FIG. 5 is a partially schematic diagram of yet another manner in which a probe similar to probe 10 could be incorporated into a component that is deployable in a coaxial cable plant. In the embodiment of FIG. 5, probe 110 is contained in a housing 120 and connected to a short coaxial cable 121 having a connector 122 at the end. A battery 123 provides power to probe 110. Probe 110 is generally the same as probe 10 of FIG. 2, but includes a different power supply circuit (not shown) that is adapted to receive battery input power. In some scenarios, the embodiment of FIG. 5 could be used by coupling connector 122 to a drop connector of a conventional tap.

Probe 10 is configurable to measure or otherwise evaluate numerous signal, data and other communication parameters. Examples of such parameters are provided below. Circuits and logic for analyzing signals and data to measure or otherwise evaluate such parameters are known in the art or would be readily apparent to persons of ordinary skill in the art in view of the description provided herein.

In at least some embodiments, probe 10 is configured to monitor RF signal level on all downstream QAM channels on a regular basis. As is known in the art, RF signal strength in a coaxial cable plant is typically measured in decibel millivolts (dBmV), with 0 dBmV defined to represent a 1 mV signal on a 75 Ohm cable. RF signal level data can be extremely useful in many situations. For example, cable modems can tolerate an input signal between −15 dBmV and +15 dBmV, but performance is not uniform over this range. Optimal performance is often realized with input RF levels held between −6 dBmV to +15 dBmV. RF amplitude varies significantly over an HFC plant, however, and the amplitude variation is highly frequency dependent. Coaxial cable attenuates higher frequency carriers less than lower frequency carriers. So as to attain the correct signal level at the subscriber premises, coaxial feeder amplifiers and fiber nodes have both upstream and downstream PADs (passive attenuation devices) and equalizers to adjust signal level in different frequency ranges. Directional couplers and taps in the coaxial cable plant can also be chosen so as to have directional split and tap values that help keep the signal level reaching a subscriber premises at the correct level. Obtaining repeated RF signal levels on multiple frequency channels, from numerous locations in a coaxial cable plant, and over a prolonged period can provide data that is extremely useful for adjustment of PADs and equalizers and for adding (or replacing) taps, couplers, splitters and other components in the coaxial plant.

Additional parameters that can be measured by probe 10 for some or all channels include modulation error ratio (MER), FEC codeword error rate, signal to noise ratio (SNR), PLL lock, quantization noise (QN), and center frequency variation. As defined by DOCSIS, MER measures cluster variance (in dB) caused by a transmit waveform. MER includes effects of intersymbol interference, phase noise other transmitter degradations. FEC codeword error rate represents a ratio of the number of uncorrectable code words to the total number of code words sent without errors, with corrected errors and with uncorrectable errors. SNR, which represents the ratio (in dB) of usable signal to noise, can be defined and measured in any of various ways that are known in the art. PLL (phased lock loop) lock is a measurement of the ability of probe 10 to lock onto a carrier frequency for a given channel. QN represents is a measure of the relative noise figure when modulating a carrier. Center frequency variation represents the amount by which a particular frequency channel has varied from its assigned location in the downstream spectrum.

The above parameters are only some of the parameters that can be monitored by probe 10 according to various embodiments. Other examples of parameters that can be monitored by probe 10 include bit error rate (BER), the percentage of bits that have errors relative to the total number of bits received, and carrier-to-noise ratio (CNR), a ratio of signal power to noise power in the defined measurement bandwidth. Still another example includes errors in the program clock reference (PCR) in digital video MPEG packet streams which are measured by DOCSIS PHY/MAC sub-processor 17.

In some embodiments, probe 10 is also configurable to monitor the QAM constellation on a selected channel and to send a report providing a snapshot of the constellation. In certain embodiments, probe 10 is configured to compare a QAM constellation snapshot to a pattern stored in memory 20 and to report if the snapshot varies from the pattern by a predetermined amount.

In addition to communication parameters that are indicative of signal quality, probe 10 may also be configurable to monitor payload-specific communication parameters. As but one example, MPEG video packets can be examined to determine if digital watermarks or other data is present. In this manner, probe 10 can determine if particular content (e.g., an advertisement) has been broadcast. By way of further example, a cable company may sell advertising directed to localized markets. Content monitoring by multiple probes 10 located throughout coaxial plant portions of a cable system can provide data to confirm that advertising was broadcast at desired times, on the desired channel(s), and in the desired locations. In some embodiments, a probe may be further configured to record selected MPEG frames (e.g., selected I-frames and/or P-Frames) to provide additional confirmation of advertisement transmission. In such cases these frames could be recorded within probe 10 and transmitted upstream to a central server or other location for storage. Subsequently, an operator could spot check the stored frames to ensure that such frames were detected and recorded at the appropriate time as required by the advertisement.

As yet another example of monitorable data, probe 10 could also be configured to monitor DOCSIS set-top gateway (DSG) data and confirm that the proper services are being transmitted on the proper channels. For this monitoring, DOCSIS PHY/MAC sub-processor 17 could receive and decode DSG tunnels and extract payload data (e.g., SCTE 65 system information, SCTE 18 emergency alerts, etc.) to verify that such data has been sent and received within the plant.

As a further example of monitorable communication parameters, probe 10 could be configured to monitor the MPEG layer integrity of digital video and detect dropped packets, macroblocking (also known as "tiling") and other types of service degradation. Additionally, probe 10 could monitor program clock reference (PCR) stamps to ensure completeness of programs, monitor program identifiers (PIDs) to ensure continuity, and monitor other MPEG-specific information to ensure correct transmission of video streams.

Figure 6:
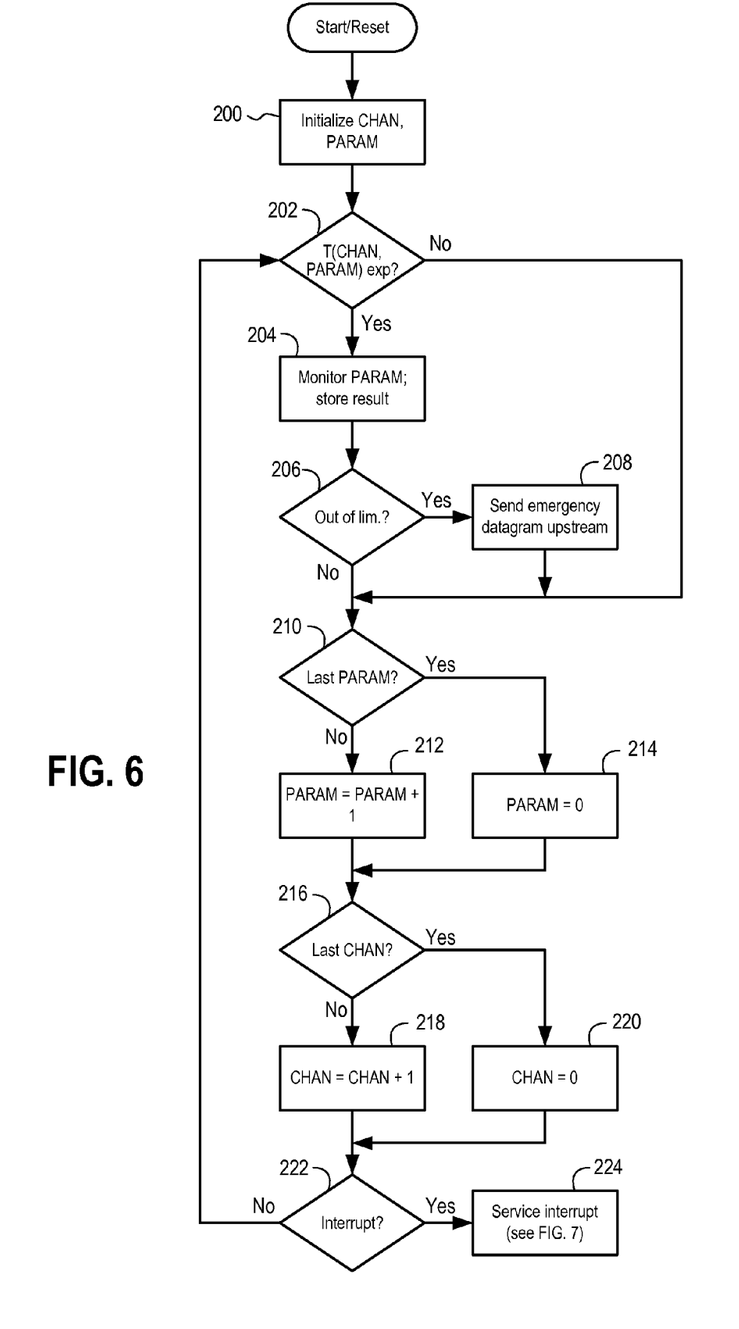
FIG. 6 is a flow chart for an algorithm of a program executable by a probe controller according to some embodiments.

FIG. 6 is a flow chart for an algorithm of a program by which controller 16 monitors various communication parameters and stores results of that monitoring for later reporting. FIG. 6 is merely one example of an algorithm by which controller 16 might operate. Numerous other algorithms are performed in other embodiments. Indeed, and as explained below, probe 10 may store multiple different programs and may change programs in response to commands or upon occurrence of certain conditions. The algorithm of FIG. 6 begins at the Start/Reset block and continues to block 200. In block 200, controller 16 initializes variables to be used in the program. In the algorithm of FIG. 6, the "CHAN" variable has values corresponding to monitored downstream frequency channels. The variable "PARAM" has values corresponding to parameters monitored by probe 10.

Figure 8:
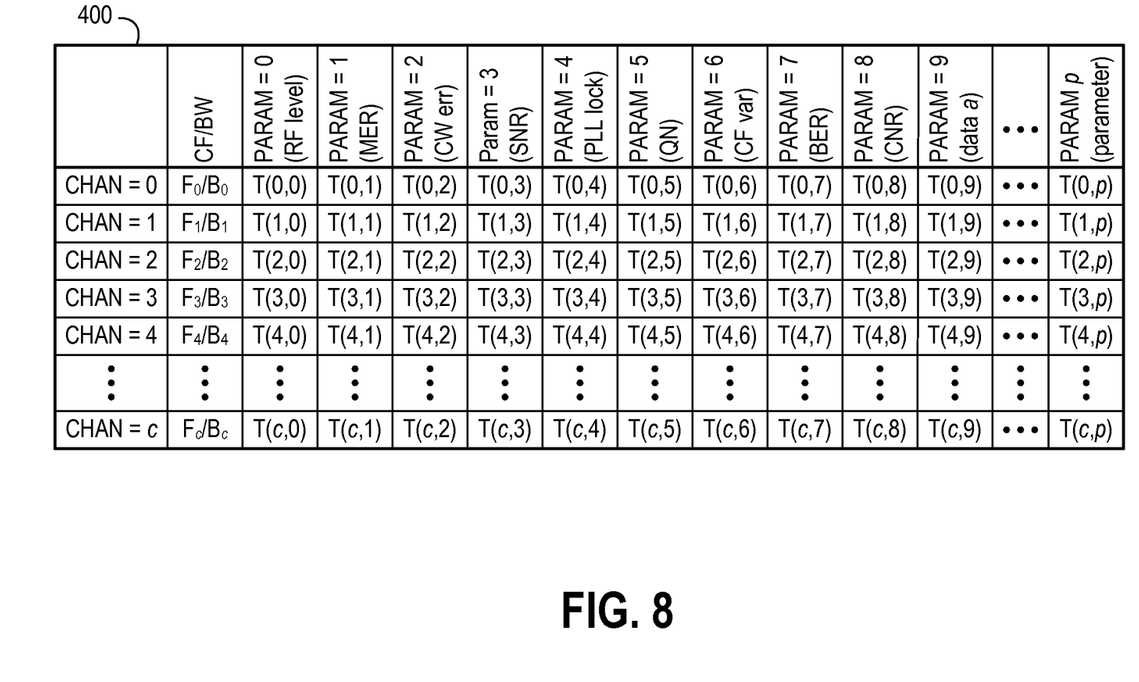
FIG. 8 is a program data table for the algorithm of FIG. 6.

For example, FIG. 8 is an example of a program data table 400 showing channels and parameters monitored (or monitorable) by probe 10 according to at least some embodiments. Program data table 400 is stored in memory 19 and/or memory 20 of probe 10 (FIG. 2) and is consulted by controller 16 during execution of a program corresponding to the FIG. 6 algorithm. Additional program data tables may be stored in memories 19 and/or 20 in connection with other programs executable by controller 16. Beginning at the left side of table 40, the cells of the first column list incremental counter values of the CHAN variable. In FIG. 8, values are shown for CHAN=0 through CHAN=4, with a vertical ellipsis indicating that table 400 can contain program data for an arbitrary number of channels c. The actual number of monitored channels will depend on the configuration of a particular network and/or on the programming of probe 10. In some cases, 10 or more channels will be monitored as part of a monitoring program. However, the number of channels on which parameters are monitored during execution of a given program could exceed 20, 50, or more channels. In some embodiments, all channels in the plant could be monitored.

The cells in the next column of table 400 ("CF/BW") contain data that is used by controller 16 to identify the center frequency (CF) and bandwidth (BW) for the channels on the corresponding rows. For simplicity, center frequency values are shown generically as "F" with a subscript matching the value of the CHAN variable on the same row. Similarly, bandwidth values are shown generically as "B" with a subscript matching the CHAN variable value of the CHAN variable on the same row. In some implementations, many of the channels will have the same value for B (e.g., 6 MHz for a DOCSIS downstream channel). In at least some embodiments, values for F and B can be reprogrammed so as to change monitored channels. A null value (e.g., all 0-bits) for the F and/or B variable(s) could be used to indicate that a channel is the last in the list.

Each of the remaining columns of table 400 corresponds to a different one of the communication parameters that can be monitored by probe 10. In the example of FIG. 8, PARAM=0 corresponds to RF signal level, PARAM=1 corresponds to MER, PARAM=2 corresponds to FEC codeword error, etc. The value PARAM=9 corresponds to a monitored data parameter (data a) that could be one of the above-identified data parameters indicative of system performance (e.g., MPEG packet sequence, DSG integrity, etc.), a data parameter that confirms advertising or other specific content has been transmitted, etc. As shown by the horizontal ellipses in the rows of table 400, probe 10 is configurable to monitor an arbitrary number p of communication parameters.

Each of the cells in the PARAM value columns contains a time value representing a number of system clock increments or other suitable time units. In FIG. 8, the time values are represented generically by cell entries in the form "T(<1st no.>,<2d no.>)", where <1st no.> corresponds to the CHAN value for the cell row and <2d no.> corresponds to the PARAM value for the cell column (i.e., T(CHAN, PARAM)). For each (CHAN,PARAM) value pair, table 400 stores a time T that represents how often probe 10 is to monitor the corresponding parameter on the corresponding channel. For example, signal to noise ratio (PARAM=3) is to be measured on the channel with center frequency $F_2$ and bandwidth $B_2$ (CHAN=2) in periodic increments that are separated by a number of time units shown generically in FIG. 8 as T(2,3). In actuality, T(2,3) might be a specific number (e.g., a number of system clock periods equal to one hour). Some or all of the T values in table 400 of FIG. 8 can be different, and the values can be reprogrammed. In some embodiments, controller 10 is configured to recognize a specific null time value (e.g., all 1-bits) as an indicator that a parameter is not to be monitored on the current channel. This permits configuration of probe 10 to monitor some, none, or all of the communication parameters for any given channel and with any desired rate of repeated monitoring.

For example, assume a cable system operator wishes to monitor RF level on channels 0-4 hourly, MER on channel 0 every 3 hours, and MER on channels 1 and 2 every 1.5 hours. The value of each of T(0,0), T(1,0), T(2,0), T(3,0) and T(4,0) is set to a number of time units corresponding to one hour, the value of T(0,1) is set to a number of time units corresponding to 3 hours, the value of T(1,1) and the value of T(2,1) are set to a number of time units corresponding to 1.5 hours, and all other T values in table 400 are set to the null value. The F and/or B value for channel 5 could also be set to a null value to indicate that only 5 channels are to be monitored, in which case the T values for channels 5 through c are irrelevant.

Returning to FIG. 6, controller 16 proceeds from block 200 to block 202 and determines if the value of T(CHAN, PARAM) has expired. In some embodiments, controller 16 makes this determination by comparing a current system clock value with a system clock value stored with the result of the last monitoring of the current parameter (i.e., the parameter corresponding to the current PARAM value) on the current channel (i.e., the channel with the frequency and bandwidth corresponding to the current CHAN value). If controller 16 determines in block 202 that T(CHAN, PARAM) has not expired or that T(CHAN,PARAM) is the null value, controller 16 advances on the "no" branch to block 210, which block is discussed below. If T(CHAN, PARAM) has expired, controller 16 advances on the "yes" branch to block 204. In block 204, controller 16 tunes tuner 14 to the frequency and bandwidth corresponding to the F and B values associated with the current CHAN value. Controller 16 then monitors the current parameter (e.g., by receiving data from DOCSIS PHY/MAC sub-processor 17 and/or signal analysis sub-processor 18 and/or analyzing said received data) and stores the result with the current system timestamp. For some parameters, controller 16 may cause tuner 14 (FIG. 2) to dwell on the current channel for a relatively prolonged period (e.g., several seconds or several minutes) so as to make the necessary evaluation. The data stored for a monitoring result will depend on the parameter being monitored. For some parameters (e.g., RF signal level), the stored monitoring result is a numeric value representing a measurement. For other parameters, the monitoring result may be a simple binary indication that a particular condition did or did not occur (e.g., that a specific advertisement was transmitted). For still other parameters, more detailed data may be stored (e.g., a QAM constellation snapshot, the contents of a transmitted data packet).

Controller 16 then proceeds from block 204 to block 206. In block 206, controller 16 determines if the monitoring result for the parameter just monitored exceeds a predefined acceptable limit. This limit could also be stored in table 400 (FIG. 8) or elsewhere in memory. For some parameters, this limit may represent a value that indicates serious systemic problems that should be immediately reported. For example, a cable system operator may determine that an RF signal level deviation of more than +/−6 dBmV from an expected long term average indicates that immediate attention is needed. For some parameters, a null value may be assigned to the acceptable limit so as to indicate that no immediate reporting is needed regardless of the current monitoring result. If controller 16 determines in block 206 that the current parameter is out of limits, controller 16 proceeds to block 208 and transmits an immediate upstream datagram reporting the parameter.

From block 208, or on the "no" branch from block 206 if the monitored parameter is not out of limits, controller 16 advances to block 210 and determines if the current parameter is the last parameter (e.g., PARAM=p in FIG. 8). If not, controller 16 advances on the "no" branch to block 212 and increments PARAM by 1. Otherwise, controller 16 advances on the "yes" branch to block 214 and resets PARAM to 0. From either block 212 or block 214, controller 16 proceeds to block 216. In block 216, controller 16 determines if the current channel is the last channel (e.g., if F or B is equal to null for the next CHAN value). If not, controller 16 advances on the "no" branch to block 218 and increments CHAN by 1. Otherwise, controller 16 advances on the "yes" branch to block 220 and resets CHAN to 0. From either block 218 or block 220, controller 16 proceeds to block 222.

In block 222, controller 16 determines if it has received a system interrupt message indicating that the current execution of the program corresponding to the FIG. 6 algorithm should be suspended. In at least some embodiments, controller 16 maintains one or more queues into which interrupt messages can be placed. Such interrupts can be received in downstream messages addressed to probe 10, can be generated by programs executing on separate programming threads in main processor 15, can be hardware-generated interrupts, or can be generated in any of various other manners. If no interrupts are in the interrupt queue(s), controller 16 returns to block 202 on the "no" branch from block 222, and the algorithm of FIG. 6 is repeated. If one or more interrupts have been received, controller 16 proceeds to block 224 to service the interrupt(s).

Figure 7:
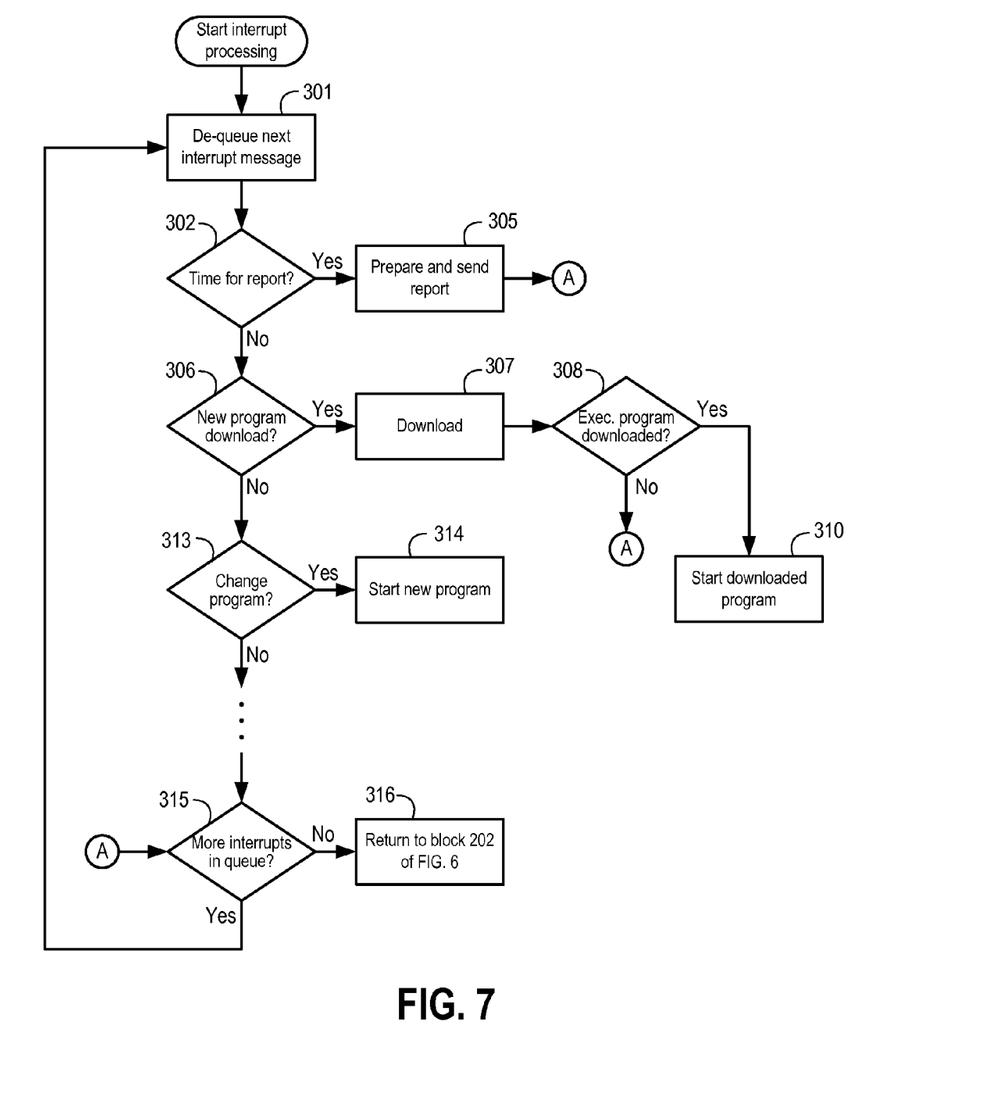
FIG. 7 is a flow chart for an algorithm of an interrupt message servicing program executable by a probe controller according to at least some embodiments.

FIG. 7 is a flow chart showing an algorithm for interrupt servicing according to at least some embodiments. In block 301 controller 16 de-queues the oldest interrupt message in the queue (which queue may be a first-in first out queue). In block 302, controller determines if the de-queued interrupt message indicates that it is time to transmit a report on an upstream channel so as to provide monitored parameter data stored at block 204 during successive loops through the FIG. 6 algorithm. In at least some embodiments, and so as not to consume upstream bandwidth needed for subscriber communications, data for the results of routine parameter monitoring is accumulated by probe 10 in memory 20 and transmitted periodically (e.g., daily) at off-peak times. Continuing with the example discussed in connection with FIG. 8 of monitoring RF level on channels 0 through 4 and MER on channels 0, 1 and 2, a report of monitoring results could include 24 RF level measurements for each of channels 0-4 at hourly increments, 8 MER measurements for channel 0 at 3-hour increments, and 16 MER measurements for each of channels 1 and 2 at 1.5-hour increments.

If the de-queued interrupt message indicates that it is time for a report, controller 16 proceeds to block 305 on the "yes" branch, where the report is prepared and sent. In some embodiments, and so as to conserve memory at probe 10, controller 16 is configured to erase stored monitoring data after receiving confirmation that the report was successfully received. From block 305, controller 16 proceeds to block 315. Block 315 is explained below.

If controller 16 determines in block 302 that the de-queued interrupt message was not an indication of a time to transmit a report, controller 16 proceeds on the "no" branch to block 306. In block 306, controller 16 determines whether the de-queued interrupt message is an indication that a new program is ready for download to probe 10. As previously indicated, memory 19 and/or memory 20 in some embodiments stores multiple programs executable by controller 16. Those programs can be stored in memory after installation of probe 10 by transmitting downstream data packets addressed to probe 10. If the de-queued interrupt message indicates that new programming is ready for download, controller 16 proceeds to block 307. In block 307, controller 16 downloads the new program(s) by, e.g., sending an upstream message indicating the probe is ready for download and then receiving additional downstream messages containing the new program(s).

A new program may, for example, be a new table that is similar to table 400 of FIG. 8, but with different values in one or more cells. In this manner, probe 10 can store multiple monitoring programs by storing multiple versions of table 400. As another example, a new program may be an instruction to modify one or more cell values in an existing table 400 previously stored in memory. As yet another example, the new program may be a modification to the monitoring routine represented by FIG. 6, or may be an entirely new monitoring routine.

From block 307, controller 16 proceeds to block 308 and determines if a newly downloaded program includes instructions to immediately execute the new program. If so, controller 16 proceeds on the "yes" branch to block 310 and executes the new program. The new program may include an instruction to return to the algorithm of FIG. 7, may include an instruction to return to or restart the algorithm of FIG. 6, may include an instruction to start another program, may run until probe 10 receives another type of interrupt message, etc. If controller 16 determines in block 308 that there is no instruction to immediately execute the newly-downloaded program, controller 16 proceeds to block 315.

If in block 306 controller 16 determined that the de-queued interrupt message was not an indication to download new programming, controller 16 would instead proceed on the "no" branch to block 313. In block 313, controller 16 determines if the de-queued interrupt message is an instruction to begin executing a program that is already stored in memory 19 or memory 20 of probe 10. In some embodiments, memory 20 stores a variety of tables similar to table 400 of FIG. 8, but which contain different T values and/or different F and B values. In response to reports of certain problems, for example, a cable system operator may wish probes in a certain region to concentrate monitoring activities on certain parameters and at certain times as reflected in a different table. Probe 10 may also store instructions corresponding to multiple monitoring routines, with some of those routines having algorithms that differ from that shown in FIG. 6 or in FIG. 7. If the de-queued interrupt does indicate that another program should be started, controller 16 proceeds on the "yes" branch to block 314 and begins executing the specified program by changing to a different program table and/or changing monitoring routine. The program specified in block 313 may include an instruction to return to the algorithm of FIG. 7, may include an instruction to return to or restart the algorithm of FIG. 6, may include an instruction to start another program, may run until probe 10 receives another type of interrupt message, etc.

If controller 16 determines in block 313 that there is no instruction to start a specified program, controller 16 proceeds to determine if the de-queued interrupt message indicates another type of action to be taken. The presence of additional decisional blocks and corresponding actions is indicated generically in FIG. 7 with a vertical ellipsis following block 313. Ultimately, and assuming that the algorithm of FIG. 7 has not been terminated to start a new program (i.e., in block 310, block 314 or in another block between blocks 313 and 315), controller 16 reaches decisional block 315. If controller 16 determines in block 315 that there are additional interrupt messages in the queue, controller 16 returns to block 301 on the "yes" branch. Otherwise, controller 16 proceeds on the "no" branch to block 316 and returns to block 202 of the algorithm of FIG. 6.

The algorithm of FIG. 7 is merely one example of how controller 17 may service interrupts. In other embodiments, other algorithms are employed and/or interrupts are prioritized in different manners. For example, controller 16 is in some embodiments configured to maintain several interrupt queues of differing priorities. All interrupts in the highest priority queue are serviced, followed by interrupts in the next highest priority queue, etc. Although only one interrupt decision block is shown in FIG. 6, similar decision blocks could be distributed at numerous other points through the algorithm.

As indicated above, the algorithm of FIG. 6 is merely one example of an algorithm for a program by which probe 10 could operate. As also indicated above, probe 10 can also be configured (or reconfigured) to monitor any combination of communication parameters on any desired schedule. In some embodiments, for example, RF signal level is monitored hourly for each channel. In the event of a reported problem and/or in the event of an emergency report of an RF signal level being out of limits (block 208 of FIG. 6), a separate program can be activated (or downloaded and activated) to limit monitoring to PLL lock, MER and FEC codeword error on certain problematic channels. In some embodiments, probe 10 is configured to automatically change to a different monitoring program upon determining that a parameter is out of acceptable limits or on detection of some other predetermined condition.

In some embodiments, a time T stored in table 400 may also (or alternatively) include a specific time and/or date on which monitoring of a particular communication parameter is to begin. For example, table 400 may store data indicating that a probe is to begin monitoring parameter p at a particular time on a particular day and to continue monitoring that parameter every 30 minutes thereafter. As another example, table 400 may store data indicating that a probe is to begin monitoring parameter p at a first time on a particular day and to continue monitoring that parameter every 10 seconds until a second time on that same day.

Downstream messages to probe 10 and upstream messages from probe 10 can be formulated as DOCSIS MAC management messages and appropriate values assigned to one or more fields so as to mark messages as a program download, an instruction to change programs, an emergency parameter report, a routine monitoring report, etc. Additional types of instructions can also be provided to probe 10 in a downstream message (e.g., to change upstream channels used by probe 10 for reporting).

Figure 9:
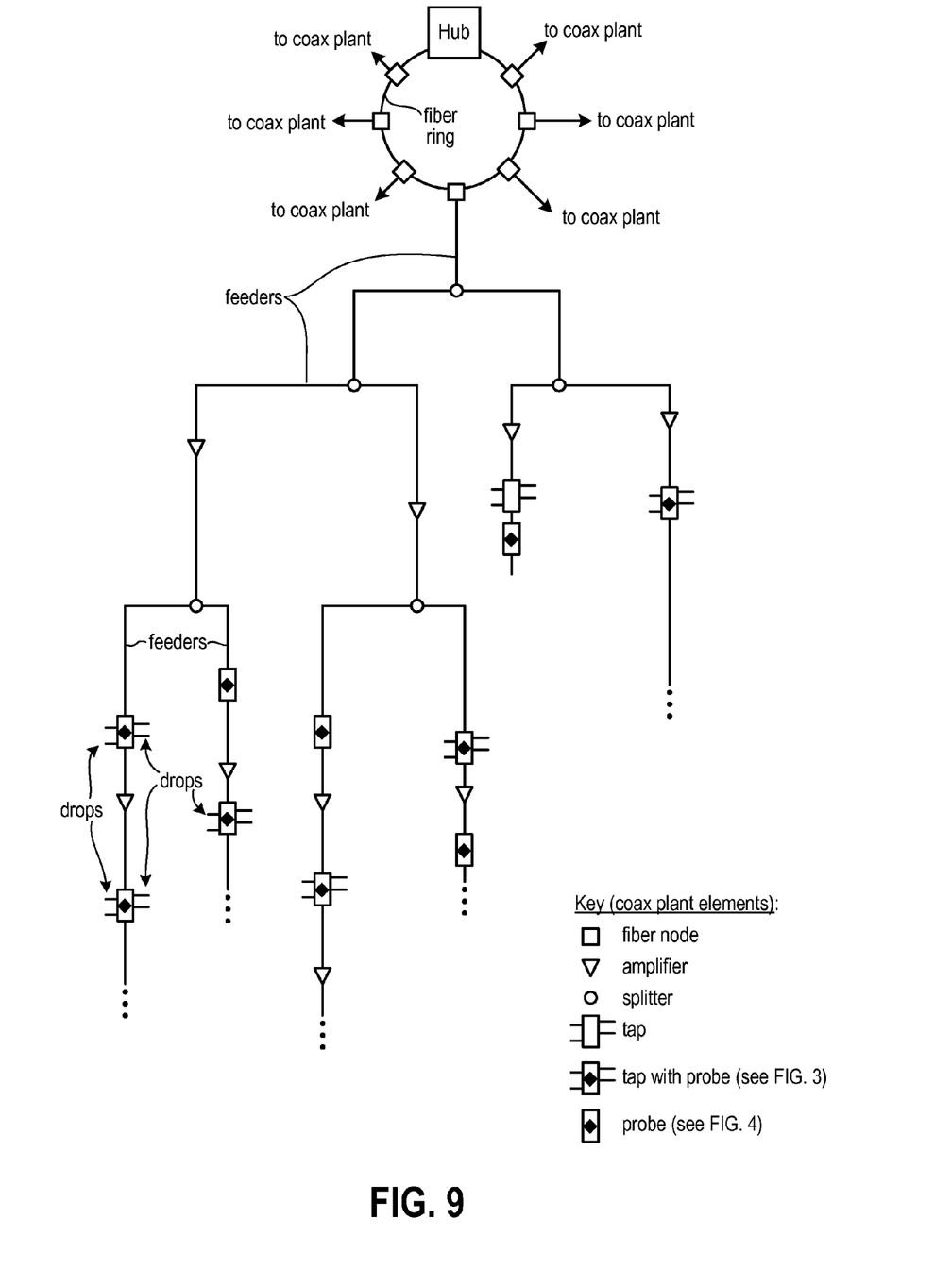
FIG. 9 is block diagram showing deployment of monitoring probes according to some embodiments.

FIG. 9 is a block diagram showing one example of a manner in which multiple probes such as probe 10 can be deployed in a coaxial plant of a cable system. FIG. 9 shows a portion of a coaxial cable plant emanating from a single node of a single hub in a cable system similar to that of FIG. 1. Numerous probes are deployed throughout continuing portions of the cable plant represented with ellipses, and additional probes are similarly deployed in the parts of the coaxial cable plant emanating from other nodes. Probes are similarly deployed in the coaxial cable plants associated with other hubs. Some of the probes are included in taps (such as tap 50 of FIG. 3), some are included within in-line probes such as in FIG. 4, and others (not shown) are deployed using devices such as shown in FIG. 5. Probes could also be incorporated into other components (e.g., within a node, within a line extender, within an amplifier, etc.). The number of probes located in a coaxial cable plant can vary in different embodiments. In at least some embodiments, for example, a probe is located after every amplifier in a coaxial cable plant. In embodiments, a probe is deployed at or near every amplifier or equalizer in the coaxial plant, and/or in every run of feeder cable over 3000 feet in length. In still other implementations, the portion of a coaxial plant associated with each node has four or more probes deployed in that coaxial plant portion.

Monitoring data from the probes can be periodically reported to a central collection point and/or can be reported on demand. That collection point can be in the hub (e.g., incorporated into a CMTS), or monitoring data can be forwarded from a hub to another location (e.g., a management server) that collects monitoring data for multiple hubs. The monitoring data can be used to periodically evaluate system performance, to quickly detect equipment malfunctions, to diagnose reported problems, to determine if advertising or other content has been transmitted where and when intended, etc. In some embodiments, monitoring data from probes is also used to remotely adjust amplifiers, equalizers and PADs within a coaxial cable plant.

In some embodiments, a probe may include a temperature sensor to provide temperature data for calibration of the probe and/or for adjustment PADs, equalizers or other components to account for temperature-dependent effects on coaxial cable lines. The temperature sensor can also be periodically monitored and the results communicated to the central collection point.

Figure 10:
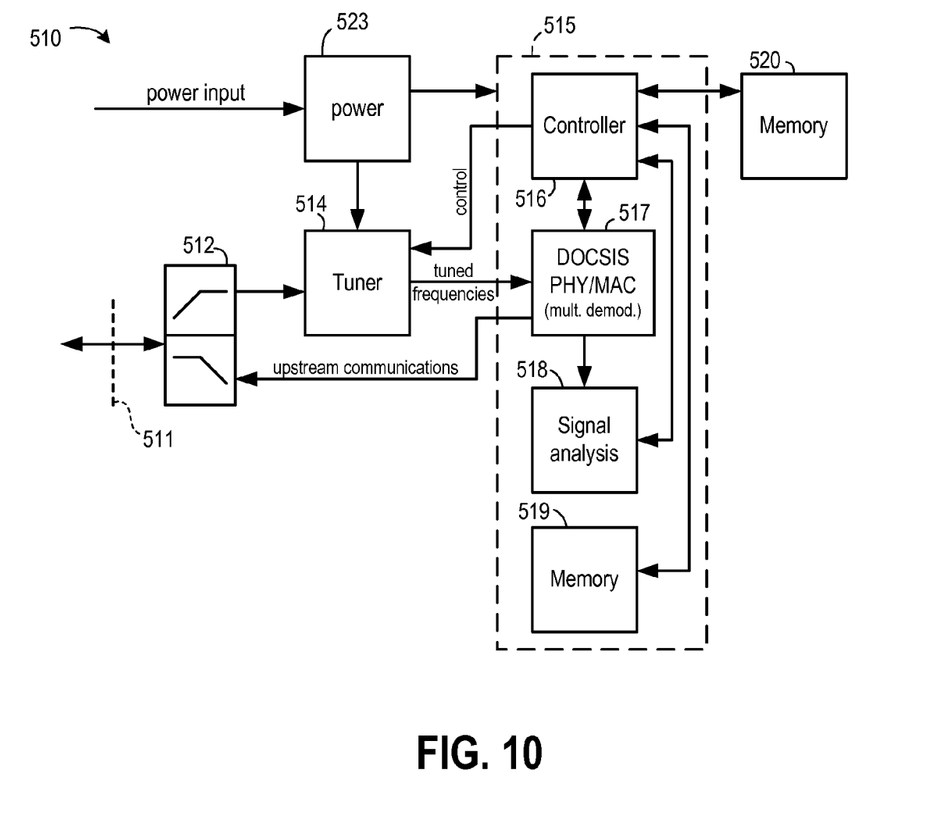
FIG. 10 is a block diagram of a monitoring probe according to some additional embodiments.

FIG. 10 is a block diagram of a probe 510 according to some additional embodiments, and which could be used in any of the implementations described above in connection with probes 10 or 110. Probe 510 is similar to probe 10, except that probe 510 is configured to simultaneously monitor communication parameters on each of multiple frequency channels. Unlike tuner 14 of probe 10, tuner 514 outputs a signal corresponding to multiple tuned frequencies (e.g., 4 or more frequency channels). Those tuned frequencies are input to DOCSIS PHY/MAC processor 517, which includes multiple demodulators and other circuitry to process signals on all of the tuned frequencies in parallel. Data is output from DOCSIS PHY/MAC sub-processor to controller 516 and to signal analysis sub-processor 518, which operate similar to controller 16 and signal analysis sub-processor 18 of probe 10. In probe 510, however, controller 516 may execute multiple instances of the algorithms described above in separate programming threads (e.g., a separate thread for each tuned frequency channel). Power supply circuit 523, hardware interface 511, diplexer 512, memory 520 and memory 519 are respectively similar to circuit 23, hardware interface 11, diplexer 12, memory 20 and memory 19 of probe 10, except that memory 519 and/or memory 520 may store additional data and instructions corresponding to parallel monitoring of simultaneous channels. The components shown in block 515 and/or in other blocks of FIG. 10 may be included on a single ASIC or may be distributed across multiple ASICs.

Figure 11:
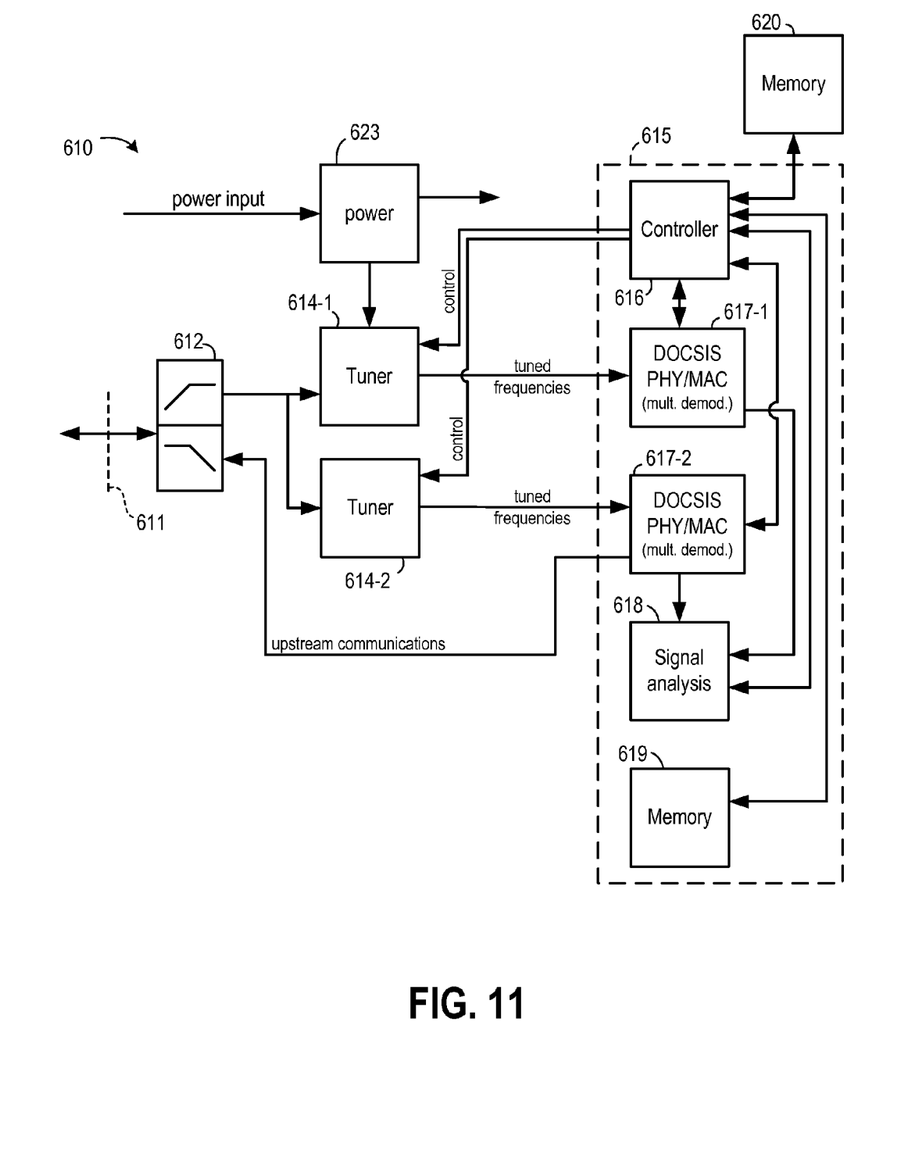
FIG. 11 is a block diagram of a monitoring probe according to some further embodiments.

FIG. 11 is a block diagram of a probe 610 according to some further embodiments, and which could be used in any of the implementations described above in connection with probes 10 or 110. Probe 610 is similar to probe 510, except that multiple tuners 614-1 and 614-2 are included to support parallel monitoring of even more frequency channels, and multiple DOCSIS PHY/MAC sub-processors 617-1 and 617-2 are included to provide additional demodulators and other circuitry to monitor additional channels in parallel. Remaining elements in FIG. 11 are similar to elements in FIG. 10 having a similar reference number offset by 100, except that controller 616 may execute additional program threads and memory 619 and/or memory 620 may store additional data and instructions corresponding to parallel monitoring of additional channels. In still other embodiments, additional tuners, DOCSIS PHY/MAC processors and/or other components may be included to further increase the number of channels that can be monitored in parallel.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. As but one example, embodiments of the invention include one or more tangible machine-readable storage media storing instructions that, when executed by one or more processors or other devices, cause a probe to carry out operations such as are described herein. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatus, modules, systems, and machine readable media.

What is claimed is:

1. An apparatus comprising:
   one or more processors; and
   memory storing instructions that, when executed by the one or more processors, cause the apparatus to:
   monitor one or more signal quality parameters for one or more of a plurality of downstream channels;
   detect one or more data payloads within an encoded data stream being transmitted on the one or more of a plurality of downstream channels, the encoded data stream comprising a plurality of video packets that comprise a watermark corresponding to one of the data payloads;
   store, from the plurality of video packets, one or more video frames that comprise the watermark;
   transmit, towards a source of the encoded data stream, the stored one or more video frames that comprise the watermark; and
   transmit a quadrature amplitude modulation (QAM) constellation diagram generated from one of the plurality of downstream channels towards the source of the encoded data stream.

2. The apparatus of claim 1, wherein monitoring one or more signal quality parameters for one or more of the plurality of downstream channels comprises:
   monitoring a first signal quality parameter on a first downstream channel of the plurality of downstream channels on a first periodic basis; and
   monitoring a second signal quality parameter on the first downstream channel of the plurality of downstream channels on a second periodic basis.

3. The apparatus of claim 1, wherein monitoring one or more signal quality parameters for one or more of the plurality of downstream channels comprises:
   monitoring a first signal quality parameter on a first downstream channel of the plurality of downstream channels on a first periodic basis; and
   monitoring the first signal quality parameter on a second downstream channel of the plurality of downstream channels on a second periodic basis.

4. The apparatus of claim 1, wherein the memory further stores instructions that, when executed by the one or more processors, cause the apparatus to
   store a measured value for each of the one or more monitored signal quality parameters.

5. The apparatus of claim 4, wherein the memory further stores instructions that, when executed by the one or more processors, cause the apparatus to report measured values for each of the monitored signal quality parameters upon receipt of a trigger in a downstream message.

6. The apparatus of claim 2, wherein the memory further stores instructions that, when executed by the one or more processors, cause the apparatus to report a measured value of a monitored signal quality parameter responsive to a determination that a measured value of a first monitored signal quality parameter exceeds a predefined limit.

7. The apparatus of claim 1, wherein the memory further stores instructions that, when executed by the one or more processors, cause the apparatus to:
   compare the QAM constellation diagram with a QAM constellation snapshot stored in a memory associated with the apparatus; and
   transmit a report if the QAM constellation snapshot varies from the QAM constellation diagram by a predetermined amount.

8. The apparatus of claim 5, wherein the memory further stores instructions that, when executed by the one or more processors, cause the apparatus to:
   receive a confirmation that the reported measured values for each of the monitored signal quality parameters was successfully received; and
   erase the reported measured values.

9. The apparatus of claim 6, wherein the memory further stores instructions that, when executed by the one or more processors, cause the apparatus to:
   receive a confirmation that the reported measured value was successfully received; and
   erase the reported measured value.

10. The apparatus of claim 1, wherein the memory further stores multiple monitoring programs to monitor the one or more signal quality parameters for one or more of the plurality of downstream channels.

11. A method comprising:
    monitoring, by a computing device, one or more signal quality parameters for one or more of a plurality of downstream channels;
    detecting one or more data payloads within an encoded data stream being transmitted on the one or more of a plurality of downstream channels, the encoded data stream comprising a plurality of video packets that comprise a watermark corresponding to one of the data payloads;
    storing, from the plurality of video packets, one or more video frames that comprise the watermark;
    transmitting, from the computing device and towards a source of the encoded data stream, the stored one or more video frames that comprise the watermark; and
    transmitting, from the computing device and towards the source of the encoded data stream, a quadrature amplitude modulation (QAM) constellation diagram generated from one of the plurality of downstream channels.

12. The method of claim 11, wherein the monitoring, by the computing device, one or more signal quality parameters for one or more of the plurality of downstream channels comprises:
    monitoring a first signal quality parameter on a first downstream channel of the plurality of downstream channels on a first periodic basis; and
    monitoring a second signal quality parameter on the first downstream channel of the plurality of downstream channels on a second periodic basis.

13. The method of claim 12, further comprising reporting a measured value of a monitored signal quality parameter responsive to a determination that a measured value of a first monitored signal quality parameter exceeds a predefined limit.

14. The method of claim 13, further comprising:
    receiving a confirmation that the reported measured value was successfully received; and
    erasing the reported measured value.

15. The method of claim 11, wherein the monitoring, by the computing device, one or more signal quality parameters for one or more of the plurality of downstream channels comprises:

monitoring a first signal quality parameter on a first downstream channel of the plurality of downstream channels on a first periodic basis; and monitoring the first signal quality parameter on a second downstream channel of the plurality of downstream channels on a second periodic basis.

16. The method of claim 11, further comprising storing a measured value for each of the one or more monitored signal quality parameters.

17. The method of claim 16, further comprising reporting measured values for each of the monitored signal quality parameters upon receipt of a trigger in a downstream message.

18. The method of claim 17, further comprising:

receiving a confirmation that the reported measured values for each of the monitored signal quality parameters was successfully received; and erasing the reported measured values.

19. The method of claim 11, further comprising:

comparing the QAM constellation diagram with a QAM constellation snapshot stored in a memory associated with the computing device; and transmitting a report if the QAM constellation snapshot varies from the QAM constellation diagram by a predetermined amount.

20. The method of claim 11, further comprising storing multiple monitoring programs to monitor the one or more signal quality parameters for one or more of the plurality of downstream channels.

* * * * *

UNITED STATES PATENT AND TRADEMARK OFFICE
CERTIFICATE OF CORRECTION

PATENT NO. : 9,930,327 B2
APPLICATION NO. : 13/932629
DATED : March 27, 2018
INVENTOR(S) : Salinger et al.

Page 1 of 1

It is certified that error appears in the above-identified patent and that said Letters Patent is hereby corrected as shown below:

In the Specification

Column 4, Detailed Description, Line 66:
Delete "(CM-SP-PHYv3.0-107-080522);" and insert --(CM-SP-PHYv3.0-I07-080522);--

Column 9, Detailed Description, Line 44:
Delete "10" and insert --16--

In the Claims

Column 15, Claim 4, Line 51:
After "to" delete "¶"

Signed and Sealed this
Fifteenth Day of January, 2019

Andrei Iancu
*Director of the United States Patent and Trademark Office*